United States Patent
Kakadia et al.

(10) Patent No.: US 9,401,851 B2
(45) Date of Patent: Jul. 26, 2016

(54) NETWORK MANAGEMENT SYSTEM

(71) Applicant: Verizon Patent and Licensing Inc., Arlington, VA (US)

(72) Inventors: Deepak Kakadia, Antioch, CA (US); Arvind Aggarwal, Morganville, NJ (US); Sagiv Draznin, Walnut Creek, CA (US); Lalit R. Kotecha, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 141 days.

(21) Appl. No.: 14/229,448

(22) Filed: Mar. 28, 2014

(65) Prior Publication Data

US 2015/0281004 A1    Oct. 1, 2015

(51) Int. Cl.
*H04L 12/24* (2006.01)
*H04L 12/26* (2006.01)

(52) U.S. Cl.
CPC ........ *H04L 41/5025* (2013.01); *H04L 41/0816* (2013.01); *H04L 41/147* (2013.01); *H04L 41/5009* (2013.01); *H04L 41/142* (2013.01); *H04L 41/5003* (2013.01); *H04L 43/087* (2013.01); *H04L 43/0817* (2013.01); *H04L 43/0835* (2013.01); *H04L 43/0858* (2013.01); *H04L 43/0888* (2013.01); *H04L 43/16* (2013.01)

(58) Field of Classification Search
CPC ............ H04L 41/5025; H04L 41/5009; H04L 41/5003; H04L 41/142; H04L 12/6418; G06F 9/4881; G06F 17/30598; G01R 31/08; G06Q 10/06
See application file for complete search history.

(56) References Cited

U.S. PATENT DOCUMENTS

| | | | | |
|---|---|---|---|---|
| 2010/0091671 A1* | 4/2010 | Lidstrom | ............ | H04L 41/5003 370/252 |
| 2010/0274637 A1* | 10/2010 | Li | ............ | G06Q 10/06 379/265.06 |
| 2012/0131172 A1* | 5/2012 | Falk | ............ | H04L 12/6418 709/224 |
| 2013/0166730 A1* | 6/2013 | Wilkinson | ............ | H04L 41/142 709/224 |
| 2014/0310714 A1* | 10/2014 | Chan | ............ | G06F 17/30598 718/102 |

* cited by examiner

*Primary Examiner* — Chi H Pham
*Assistant Examiner* — Shailendra Kumar (57) ABSTRACT

A system may be configured to store a set of service-level agreements ("SLAs") associated with a subscriber. The system may receive key performance indicator ("KPI") information for traffic that traverses one or more nodes of a network; forecast, based on the SLA information and the KPI information, a violation of the particular SLA; take corrective action, based on the forecasting; and output, to the subscriber, derived information based on the KPI information. The derived information may be outputted after taking the corrective action, and may indicate that the particular SLA was not violated. The derived information may be outputted at a slower rate than a rate at which the KPI information is received by the system.

20 Claims, 7 Drawing Sheets

| SLA ID | PER | Latency | Throughput |
|---|---|---|---|
| SLA_1 | $10^{-6}$ | 120 ms | 15 MB/s |
| SLA_2 | $10^{-7}$ | 100 ms | 20 MB/s |
| SLA_3 | $10^{-8}$ | 80 ms | 30 MB/s |

| Service ID | SLA ID |
|---|---|
| Service_1 | SLA_1 |
| Service_2 | SLA_2 |
| Service_3 | SLA_1 |
| Service_4 | SLA_3 |

| Subscriber ID | Service IDs |
|---|---|
| Subscriber_1 | Service_1, Service_2, Service_3 |
| Subscriber_2 | Service_2, Service_4 |
| Subscriber_3 | Service_1, Service_3, Service_4 |
| Subscriber_4 | Service_3, Service_4 |

| Subscriber ID | Service ID | SLA ID |
|---|---|---|
| Subscriber_1 | Service_1 | SLA_1 |
| Subscriber_1 | Service_2 | SLA_2 |
| Subscriber_1 | Service_3 | SLA_1 |
| Subscriber_2 | Service_3 | SLA_3 |
| Subscriber_2 | Service_4 | SLA_2 |
| Subscriber_3 | Service_1 | SLA_2 |

NETWORK MANAGEMENT SYSTEM

BACKGROUND

Networks allow communication user devices (such as cellular telephones, desktop computers, etc.) to communicate with other devices (such as servers, other user devices, etc.). Traffic to and/or from user devices may traverse multiple different network devices, such as base stations and/or gateways, and links between the network devices. A subscriber and a network provider may have a set of service-level agreements ("SLAs") in place, whereby the network provider may guarantee a specific level of quality of service ("QoS") to the subscriber for certain services.

DETAILED DESCRIPTION OF PREFERRED EMBODIMENTS

The following detailed description refers to the accompanying drawings. The same reference numbers in different drawings may identify the same or similar elements.

Techniques described herein may allow for the enforcement of service-level agreements ("SLAs") subscribed to by subscribers of a network. For example, according to some implementations, a network management system ("NMS") may monitor key performance indicators ("KPIs") associated with the network to forecast, and correct, potential SLA violations before they are detectable to a subscriber.

Figure 1:
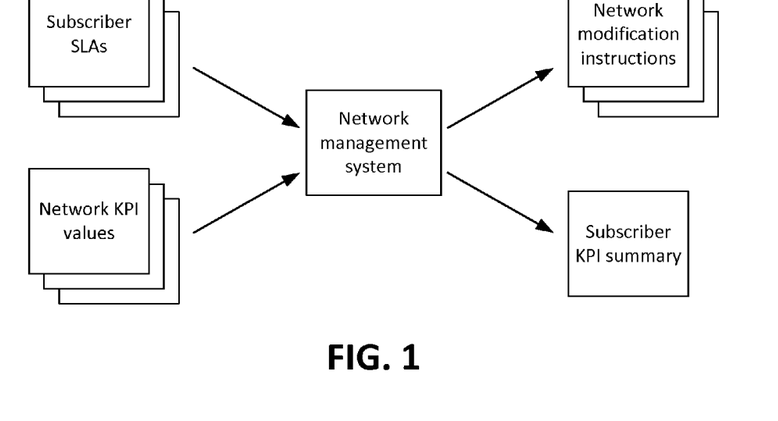
FIGS. 1 and 2 illustrate an overview of one or more example implementations described herein.

For example, as shown in FIG. 1, the NMS may receive information regarding subscriber SLAs and KPI values associated with the network. Subscriber SLAs may specify, for example, quality of service ("QoS") levels to which subscribers have subscribed. For instance, a particular SLA may specify a maximum latency for voice over Internet Protocol ("VoIP") traffic associated with the subscriber, while another SLA may specify a minimum throughput for file transfer traffic associated with the subscriber. The network KPI values may include performance metrics or other information associated with the network and/or a user device associated with the subscriber, such as end-to-end latency, intra-node latency (e.g., latency between one or more nodes within the network), packet error rate ("PER"), throughput, and/or other values.

The NMS may analyze the received network KPI values (e.g., in real time, or near real time) in order to detect potential SLA violations, before such violations are visible to the subscriber. For instance, as shown, the NMS may provide the subscriber with a subscriber KPI summary, which includes information regarding KPI values that may be relevant to the subscriber (e.g., KPI values regarding traffic sent to and/or from a device associated with the subscriber). As also shown, the NMS may output network modification instructions, based on comparing the subscriber SLAs with the network KPI values.

In accordance with some implementations, the network KPI values may be analyzed, and the network modification instructions may be generated, at a faster rate than the KPI values are presented to the subscriber. In this manner, the NMS may be able to forecast potential SLA violations before the subscriber receives any indication that an SLA was violated, and may take corrective action, such that the subscriber does not receive an indication that an SLA was violated.

Figure 2:
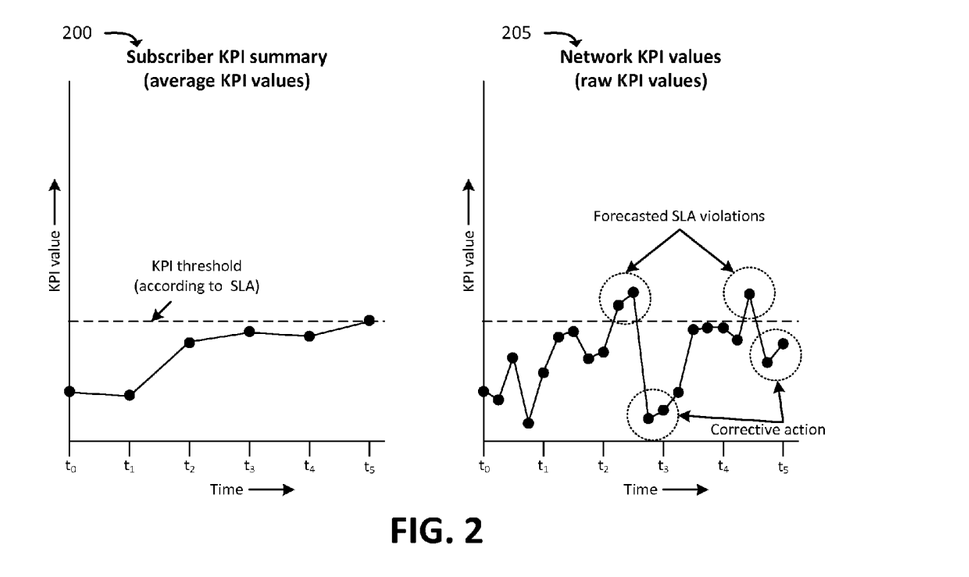

For example, FIG. 2 illustrates two graphs 200 and 205 that may relate to the same network KPI values. The "Subscriber KPI summary" graph (graph 200) illustrates information that may be provided to a subscriber, while the "Network KPI values" graph (graph 205) may illustrate raw KPI values that are received by the NMS. The "KPI value" shown in the graph may be any KPI value, such as latency, throughput, PER, etc.

The data points shown in graph 200 may be composite values that are based on raw KPI values. For example, the data points shown in graph 200 may be averages of raw KPI values received by the NMS. Thus, the data points presented in graph 200 may be fewer in quantity than the actual received KPI values, and may also be presented less frequently than the actual KPI values are received. For example, graph 200 shows one data point for each time interval (denoted by $t_0$, $t_1$, $t_2$, etc.), while graph 205 shows four data points for each time interval. As an example, the data point, at $t_1$ in graph 200, may be an average of the four data points after $t_0$, in graph 205.

As further shown in FIG. 2, a particular KPI threshold may be applicable to the particular KPI, according to an SLA (indicated by the dashed line in graphs 200 and 205). Graph 200 may indicate that the KPI threshold was not exceeded between $t_0$ and $t_5$, and that there were, therefore, no SLA violations during that time. However, as indicated by graph 205, the NMS may have detected (or "forecasted") potential SLA violations, and may have taken corrective action so that no SLA violations were detected by the subscriber.

Specifically, for example, the NMS may have detected, as indicated by the two data points after $t_2$ (in graph 205), that KPI values have exceeded the KPI threshold. As described below, based on the KPI information received from the network, the NMS may have determined potential reasons for the KPI value exceeding the threshold (e.g., a network congestion spike, an outage of a particular network segment or device, etc.), and may have identified a corrective action to take (e.g., re-route network traffic associated with the subscriber, increase a priority of network traffic associated with the subscriber, etc.). Based on the corrective action, the KPI may have been greatly improved, as indicated by the data point at $t_3$ (in graph 205) and the immediately preceding data point. That is, while the first two data points in the time period between $t_2$ and $t_3$ (in graph 205) may have exceeded the KPI threshold, the average KPI value (shown at $t_3$ in graph 200), presented to the subscriber, may be below the threshold, based on the corrective action taken. Forecasting and correcting potential SLA violations may improve subscribers' experience, and may help ensure that subscribers are receiving the level of service for which the subscribers have paid.

Figure 3:
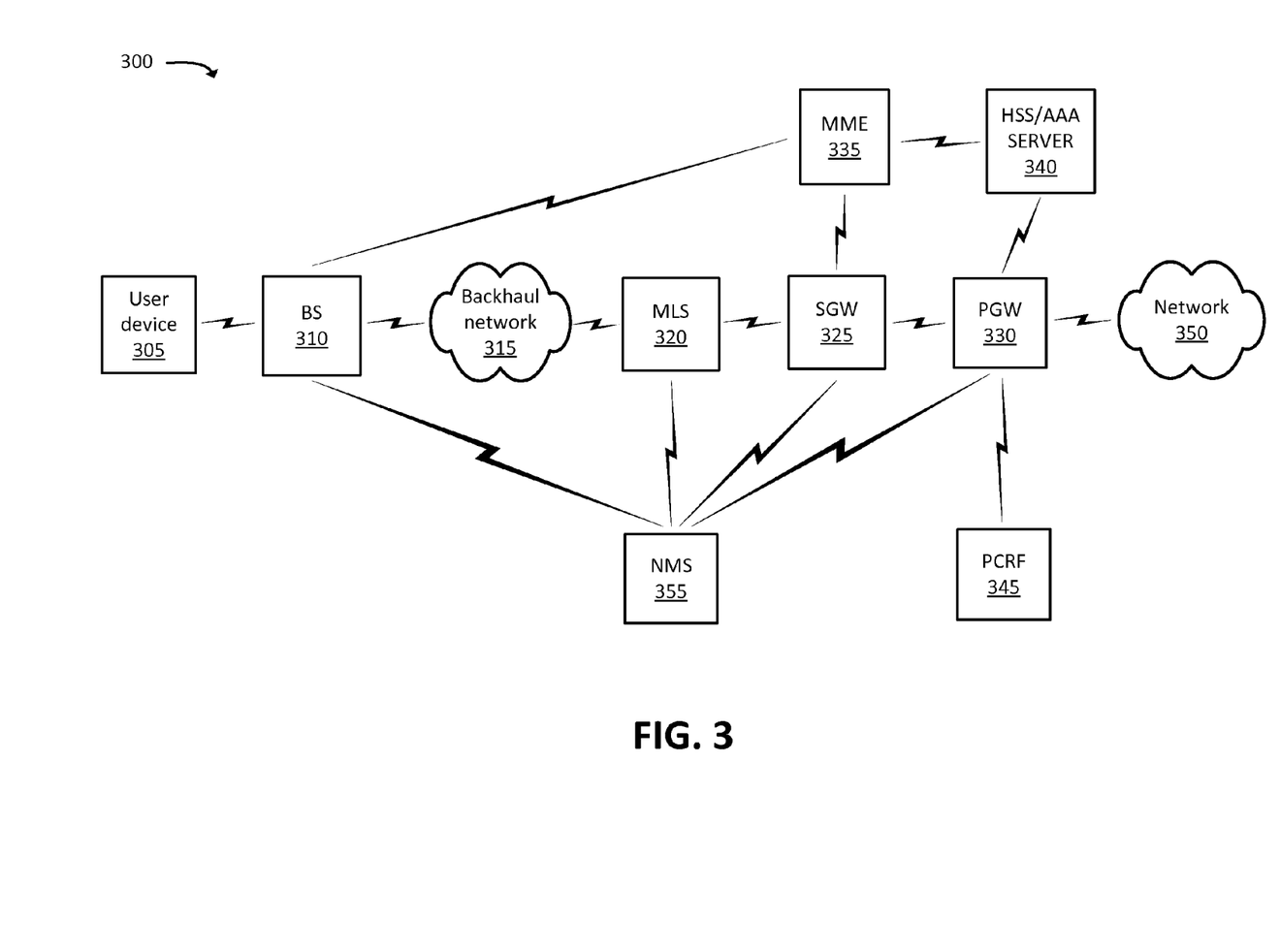
FIG. 3 illustrates an example environment in which systems and/or methods, described herein, may be implemented.

FIG. 3 illustrates an example environment 300, in which systems and/or methods described herein may be implemented. As shown in FIG. 3, environment 300 may include user device 305, base station ("BS") 310 (which may, in some implementations, take the form of an evolved node B ("eNB")), backhaul network 315, multi-layer switch ("MLS") 320, SGW 325, packet data network ("PDN") gateway ("PGW") 330, mobility management entity device ("MME") 335, home subscriber server ("HSS")/authentication, authorization, accounting ("AAA") server 340 (hereinafter referred to as "HSS/AAA server 340"), policy charging and rules function ("PCRF") 345, network 350, and NMS 355.

The quantity of devices and/or networks, illustrated in FIG. 3, is provided for explanatory purposes only. In practice, there may be additional devices and/or networks; fewer devices and/or networks; different devices and/or networks; or differently arranged devices and/or networks than illustrated in FIG. 3. Alternatively, or additionally, one or more of the devices of environment 300 may perform one or more functions described as being performed by another one or more of the devices of environment 300. Devices of environment 300 may interconnect via wired connections, wireless connections, or a combination of wired and wireless connections.

Environment 300 may include an evolved packet system ("EPS") that includes a long term evolution ("LTE") network and/or an evolved packet core ("EPC") network that operate based on a third generation partnership project ("3GPP") wireless communication standard. The LTE network may be, or may include, a radio access network ("RAN") that includes one or more base stations 310, some or all of which may take the form of an eNB, via which user device 305 may communicate with the EPC network. The EPC network may include one or more SGWs 325, PGWs 330, and/or MMEs 335, and may enable user device 305 to communicate with network 350 and/or an Internet protocol ("IP") multimedia subsystem ("IMS") core network. The IMS core network may include HSS/AAA server 340, and may manage authentication, session initiation, account information, a user profile, etc., associated with user device 305.

User device 305 may include any computation and communication device, such as a wireless mobile communication device that is capable of communicating with base station 310 and/or network 350. For example, user device 305 may include a radiotelephone; a personal communications system ("PCS") terminal (e.g., a device that combines a cellular radiotelephone with data processing and data communications capabilities); a personal digital assistant ("PDA") (e.g., that can include a radiotelephone, a pager, Internet/intranet access, etc.); a smart phone; a laptop computer; a tablet computer; a camera; a personal gaming system, or another type of mobile computation and communication device. User device 305 may send traffic to and/or receive traffic from network 350 via base station 310, backhaul network 315, MLS 320, SGW 325, and/or PGW 330.

Base station 310 may include one or more network devices that receive, process, and/or transmit traffic, such as calls, audio, video, text, and/or other data, destined for and/or received from user device 305. In one example, base station 310 may be an eNB device and may be part of the LTE network. Additionally, or alternatively, one or more other base stations 310 may be associated with a RAN that is not associated with the LTE network (e.g., a wireless hot spot, a wireless access point, etc.). Base station 310 may receive traffic from and/or send traffic to network 350 via SGW 325 and PGW 330. Base station 310 may send traffic to and/or receive traffic from user device 305 via, for example, an air interface.

Backhaul network 315 may include one or more networking devices (e.g., routers and/or switches) and links (e.g., fiber or coaxial links), that connect respective base station 310 to a core network (e.g., a core network that includes MLS 320, SGW 325, and/or PGW 330). In some implementations, access to backhaul network 315 may be provided by a particular service provider, to a different service provider, who is associated with SGW 325, PGW 330, and/or network 350. Access to backhaul network 315 may be provided with QoS guarantees, such as a minimum guaranteed throughput, a maximum guaranteed latency, a minimum guaranteed reliability, and/or other QoS guarantees.

MLS 320 may include one or more network devices that perform switching functionality on traffic received from SGW 325 and/or backhaul network 315. MLS 320 may operate multiple layers of the Open Systems Interconnection ("OSI") reference model, in contrast with other switches that traditionally operate only on the Data Link Layer ("DLL"). For example, MLS 320 may perform deep packet inspection to perform routing functions.

SGW 325 may include one or more network devices that gather, process, search, store, and/or provide information in a manner described herein. SGW 325 may, for example, aggregate traffic received from one or more base stations 310 and may send the aggregated traffic to network 350 via PGW 330.

PGW 330 may include one or more network devices that gather, process, search, store, and/or provide information in a manner described herein. PGW 330 may aggregate traffic received from one or more SGWs 325, etc. and may send the aggregated traffic to network 350. PGW 330 may also, or alternatively, receive traffic from network 350 and may send the traffic toward user device 305 via SGW 325 and/or base station 310.

MME 335 may include one or more computation and communication devices that perform operations to register user device 305 with the EPS, to establish bearer channels associated with a session with user device 305, to hand off user device 305 from the EPS to another network, to hand off user device 305 from the other network to the EPS, and/or to perform other operations. MME 335 may perform policing operations on traffic destined for and/or received from user device 305.

HSS/AAA server 340 may include one or more server devices that manage, update, and/or store, in a memory associated with HSS/AAA server 340, profile information associated with a subscriber. The profile information may identify applications and/or services that are permitted for and/or accessible by the subscriber; a mobile directory number ("MDN") associated with the subscriber; bandwidth or data rate thresholds associated with the applications and/or services; information associated with the subscriber (e.g., a username, a password, etc.); rate information; minutes allowed for a subscriber; and/or other information. The subscriber may be associated with user device 305 and/or one or more other user devices 305. Additionally, or alternatively, HSS/AAA server 340 may perform authentication, authorization, and/or accounting operations associated with the subscriber and/or a communication session with user device 305.

PCRF 345 may include one or more server devices that aggregate information to and from the EPC network and/or other sources. PCRF 345 may receive information regarding policies and/or subscriptions from one or more sources, such as subscriber databases and/or from one or more users (such as, for example, an administrator associated with PCRF 345).

Network 350 may include one or more wired and/or wireless networks. For example, network 350 may include a packet data network ("PDN"), such as an IP-based PDN. Network 350 may include, for example, a wide area network such as the Internet, or one or more other networks. User device 305 may connect, through PGW 330, to data servers, application servers, or to other servers/applications that are coupled to network 350.

As described in greater detail below, NMS 355 may receive KPI information regarding network nodes that serve as signal bearers for traffic to and/or from user device 305, detect potential SLA violations, and take corrective action regarding the potential SLA violations. For example, NMS 355 may identify KPIs regarding network traffic associated with a particular subscriber, and may compare the KPIs to SLAs associated with the particular subscriber. In some implementations, NMS 355 may compare the KPIs to the SLAs on a more granular basis than KPI information is provided to the subscriber. For instance, NMS 355 may compare the KPIs to the SLAs more often (e.g., at a faster rate) than KPI information is presented to the subscriber, and/or NMS 355 may analyze more detailed KPI information than is provided to the subscriber (e.g., information regarding more KPIs, KPIs that involve internal or proprietary devices within environment 300, etc.).

Figure 4:
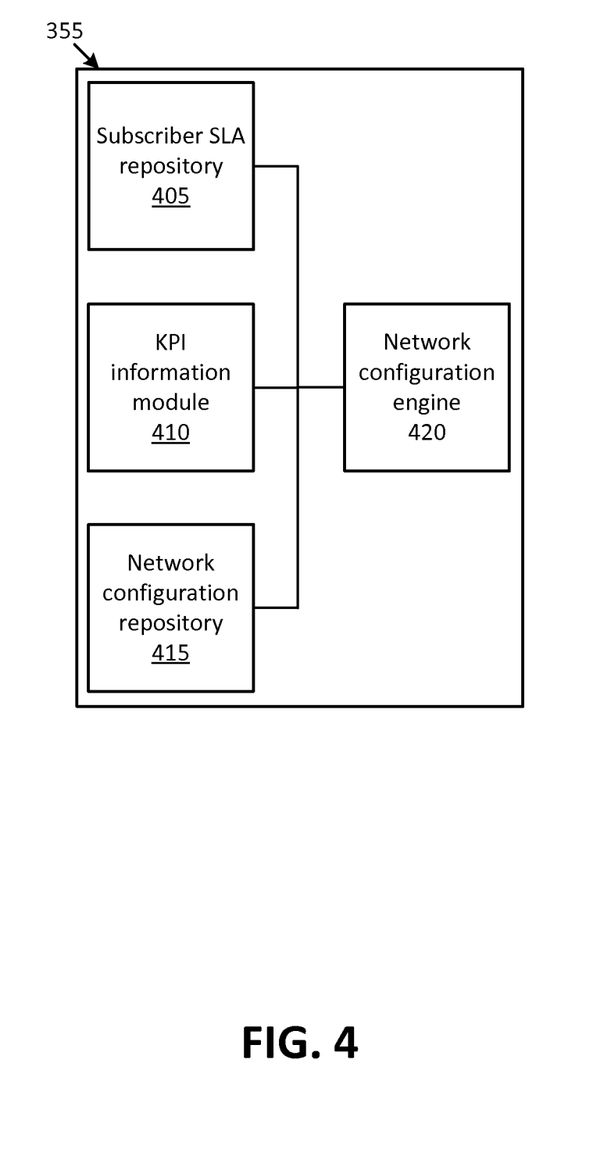
FIG. 4 illustrates example functional components of a network management system ("NMS"), according to some implementations described herein.

FIG. 4 illustrates example functional components of NMS 355. As shown, example NMS 355 may include user device 305, KPI information module 410, network configuration repository 415, and network configuration engine 420. In some implementations, modules 405-420 may be implemented via hardware and/or software. In some implementations, NMS 355 may include additional, fewer, different, or differently arranged modules than those illustrated in the example shown in FIG. 5. Further, the functionality described below with respect to one module may additionally, or alternatively, be performed by one or more other modules.

Subscriber SLA repository 405 may receive and store subscriber SLA information, which may indicate threshold levels of traffic KPIs. These threshold levels may correspond to, for example, expected and/or minimum acceptable levels of traffic performance, according to SLAs. For example, subscriber SLA information may include information regarding specifications of guaranteed latency or bandwidth through particular network nodes (e.g., a minimum amount of throughput or maximum latency that a particular network node provides), SLA specifications of guaranteed latency or bandwidth through particular links (e.g., a minimum amount of throughput or maximum latency that a particular link provides), maximum end-to-end latency (e.g., a maximum expected or acceptable latency between one network node and another network node), etc.

FIGS. 5-8 illustrate example data structures 500-800, respectively, which may be stored by subscriber SLA repository 405, which may include subscriber SLA information. In some implementations, subscriber SLA repository 405 may store all of the example data structures shown in FIGS. 5-8, additional data structures, fewer data structures, and/or different data structures. In some implementations, multiple data structures 500-800 may be used to characterize subscriber SLAs. For example, data structure 500 may include information regarding KPI thresholds associated with SLAs, data structure 600 may include information regarding which SLAs apply to which services, and data structure 700 may include information regarding which service(s) correspond to which subscribers. As another example, data structure 800 may include information that specifies which SLAs apply on a per-subscriber and on a per-service basis (e.g., the same service may be associated with different SLAs for different subscribers).

As mentioned above, data structure 500, shown in FIG. 5, may include information regarding identifiers of various SLAs ("SLA ID"), as well as example thresholds associated with the various KPIs, according to the SLAs. For example, as shown, data structure 500 may correlate SLAs to thresholds regarding PER, latency, and throughput.

Figure 5:
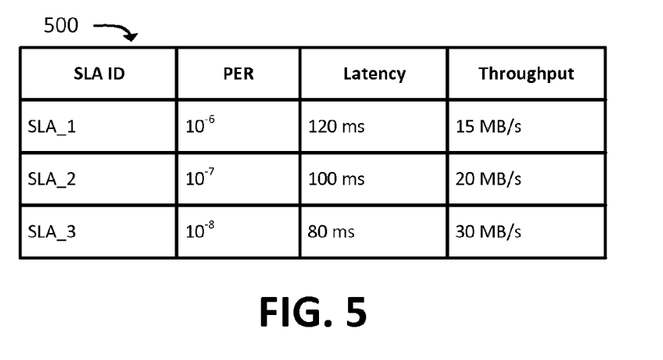
FIGS. 5-8 illustrate example data structures that may be used by an NMS in order to forecast and prevent potential SLA violations.

The SLA ID field may include an identifier of an SLA, such as a name, a description, and/or another unique identifier for a particular SLA. The PER field may specify a maximum PER associated with the particular SLA (e.g., as expressed in terms of a power of ten). The Latency field may specify a maximum latency (e.g., a maximum latency through a particular network segment, an end-to-end latency, etc.) associated with the particular SLA, and the Throughput field may specify a maximum throughput (e.g., an uplink and/or a downlink throughput) associated with the particular SLA.

While FIG. 5 illustrates certain example KPIs (PER, latency, and throughput), in some implementations, data structure 500 may include information regarding additional, fewer, or different KPIs. Further, some SLAs may include thresholds for a particular KPI, while other SLAs may not include thresholds for the same KPI. For instance, one SLA may specify a maximum latency, while another SLA may not specify a maximum latency.

Figure 6:
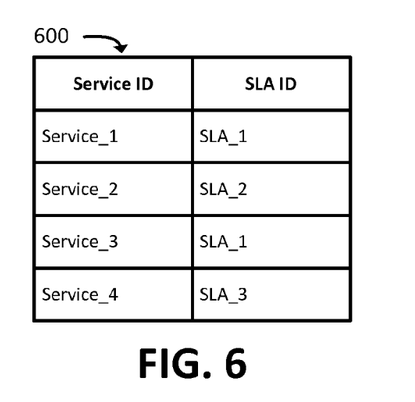

Data structure 600, shown in FIG. 6, may include information correlating services to SLAs. As shown, example data structure 600 may include identifiers of services ("Service ID"), as well as SLA identifiers ("SLA ID"). The Service ID field may include a name, a description, and/or another unique identifier associated with a service. Example services may include a VoIP call service, a file transfer service, a videoconferencing service, a video streaming service, a web hosting service, a machine-to-machine ("M2M") service, a network transport service, a network monitoring service, and/or another type of service. For instance, as shown in FIG. 6, the service having the Service ID "Service_1" may be associated with the SLA having the SLA ID "SLA_1," the service having the Service ID "Service_2" may be associated with the SLA having the SLA ID "SLA_2," and so on.

Figure 7:
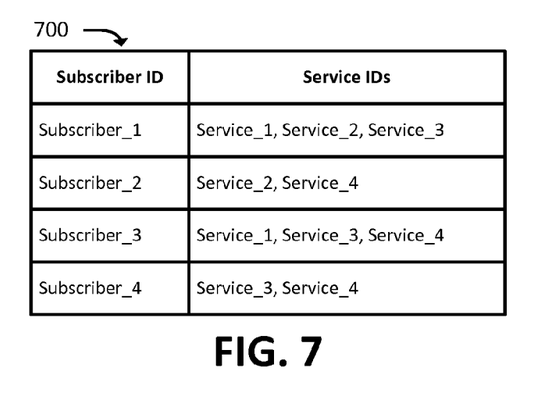

Data structure 700, shown in FIG. 7, may include information correlating subscribers to services. For instance, as shown, data structure 700 may include identifiers of subscribers ("Subscriber ID"), as well as identifiers of services ("Service ID"). The Subscriber ID field may include an International Mobile Subscriber Identity ("IMSI") value, an International Mobile Station Equipment Identity ("IMEI"), an IP address, and/or another value that uniquely identifies a particular subscriber and/or a user device associated with a subscriber. The Service IDs field may include identifiers of services associated with a particular subscriber. In some implementations, data structure 700 may be used in conjunction with data structure 600, in order to indicate which services and/or SLAs are associated with a particular subscriber.

Figure 8:
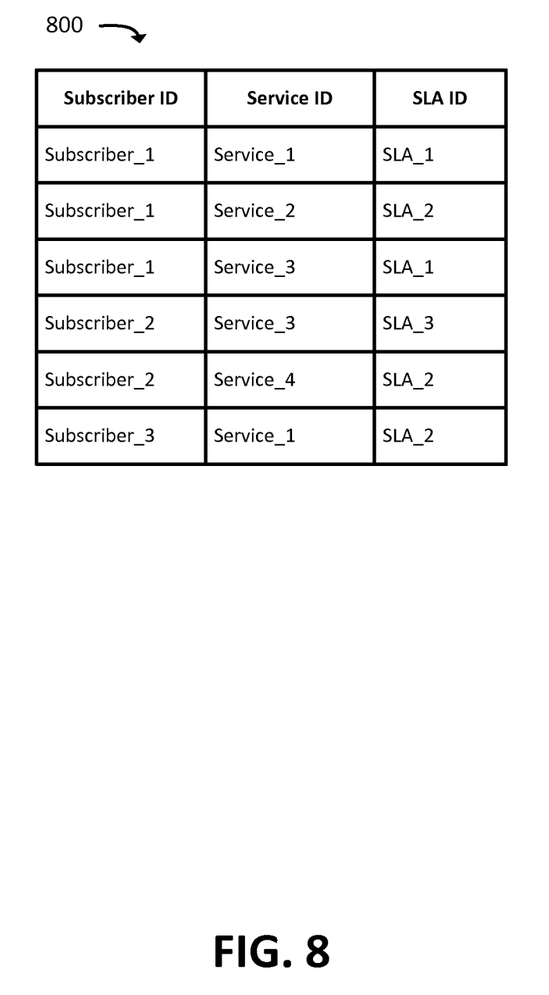

Data structure 800, shown in FIG. 8, may include per-service and per-subscriber SLA information. As shown, each entry (i.e., each row) in data structure 800 may specify an SLA for a particular service and for a particular subscriber. Thus, multiple entries may be present for each subscriber. For example, a subscriber having the Subscriber ID "Subscriber_1" may be associated with three entries (i.e., entries associated with services having the respective Service IDs "Service_1," "Service_2," and "Service_3"). As shown, the service having the Service ID "Service_1" may be associated with an SLA having the SLA ID "SLA_1," with respect to the subscriber having the Subscriber ID "Subscriber_1," while the same service may be associated with a different SLA for a different subscriber (e.g., the SLA having the SLA ID "SLA_2," with respect to the subscriber having the Subscriber ID "Subscriber_3").

Returning to FIG. 4, KPI information module 410 may receive KPI information from individual network nodes (e.g., from base station 310, MLS 320, SGW 325, PGW 330, etc.), and/or from another source. The KPI information may include, for example, information regarding traffic sent and/or received by network nodes. The KPI information may include KPIs regarding segments (e.g., network paths between two or more nodes), and/or individual nodes (e.g., KPIs measured at individual nodes). KPIs regarding segments may include, for example, inter-node latency, PER, jitter, and/or other KPIs. KPIs regarding individual nodes may include, for example, intra-node latency, queue drop rate, intra-node throughput, and/or other KPIs. The KPI information may include Simple Network Management Protocol ("SNMP") information, which may allow the KPI information to be correlated to relevant users, services, network nodes, network segments, etc. As described below, network configuration engine 420 may use the KPI information to detect, and remedy, potential SLA violations.

Network configuration repository 415 may receive and store information regarding configurations of network nodes and/or a network topology. For example, the network configuration information may include routing information (e.g., hops between individual network nodes), scheduler information (e.g., queue scheduler configurations for individual network nodes), and/or other network configuration information. The network configuration information may, in some implementations, specify how certain types of traffic are treated. For example, traffic with a particular level of QoS (e.g., traffic associated with a particular QoS Class Identifier ("QCI")), a particular subscriber, and/or a particular service may be associated with different hops and/or a different queue priority weight than traffic of another level of QoS, another subscriber, and/or another service. As described below, network configuration engine 420 may use the network configuration information to determine network modifications that may be made, in order to remedy potential SLA violations, and/or to generally modify the treatment of certain traffic.

Network configuration engine 420 may analyze subscriber SLA information, KPI information, and network configuration information in order to detect potential SLA violations, and correct such SLA violations (e.g., before a subscriber would be notified that an SLA violation has occurred). For example, network configuration engine 420 may receive some or all of this information from subscriber SLA repository 405, KPI information module 410, network configuration repository 415, and/or from another source.

In some implementations, network configuration engine 420 may compare KPI information (received from KPI information module 410) to SLA information (received from subscriber SLA repository 405), in order to determine whether KPIs are at acceptable levels. For instance, network configuration engine 420 may analyze KPIs regarding with traffic associated with a particular subscriber, and SLAs associated with the particular subscriber. Network configuration engine 420 may also receive and/or store information identifying a refresh rate, or a reporting rate, at which KPI information is presented to the subscriber. As mentioned above, network configuration engine 420 may receive KPI information at a faster rate than is reported to the subscriber. As described above (e.g., with respect to FIG. 2), since network configuration engine 420 may analyze KPI information at a faster rate than is reported to the subscriber, network configuration engine 420 may identify, and correct, potential SLA violations, such that the information reported to the subscriber indicates that no SLA violation occurred.

For example, assume that an SLA, associated with a subscriber, indicates that a maximum latency for traffic associated with the subscriber, is 40 milliseconds ("ms"). Further assume that the subscriber receives KPI information every second (e.g., receives one data point per second), while network configuration engine 420 receives KPI information four times per second (e.g., receives four data points per second). Assume that the first data point (out of four data points in a particular one-second time period), regarding traffic associated with the subscriber, indicates a latency of 30 ms, and that the second data point indicates a latency of 70 ms. At this time, network configuration engine 420 may identify a potential SLA violation, since the average of the first two data points is 50 ms (10 ms above the threshold latency).

Based on detecting the potential SLA violation, network configuration engine 420 may take corrective action, such that the average of the four data points (i.e., the two data points previously mentioned, and the subsequent two data points) falls below 40 ms. For example, network configuration engine 420 may make a modification to one or more network nodes, in order to lower the latency of traffic associated with the subscriber (and thus to cause the average of the four data points to fall below the threshold latency). The modification may include modifying routing associated with the traffic (e.g., changing the hops associated with the traffic), elevating a QCI associated with the traffic, modifying a queue weight associated with the traffic, and/or making other modifications.

When making the modification(s), network configuration engine 420 may analyze KPI information (e.g., as received from KPI information module 410) and/or network configuration information (e.g., as received from network configuration repository 415) in order to identify modification(s) that may be made, in order to correct potential SLA violations. For example, network configuration engine 420 may identify that traffic is traversing a segment, including a particular set of routing hops, that is congested. Network configuration engine 420 may identify a different segment, that includes a different set of routing hops and is less congested, and may re-route traffic along the different segment, in order to improve KPIs associated with the traffic (e.g., in order to reduce latency, increase throughput, etc.).

In some implementations, modifications made by network configuration engine 420 may be made on a temporary and/or a dynamic basis. For example, after taking corrective action to avoid a potential SLA violation, network configuration engine 420 may undo some or all of the modifications made. Undoing the modifications may be useful in a situation where potential SLA violations are due to temporary network issues. For example, when a momentary, or temporary, instance of congestion along a particular network segment causes a potential SLA violation, network configuration engine 420 may cause traffic to be transmitted via the particular segment once the congestion is alleviated. In some such implementations, network configuration engine 420 may cause traffic to be transmitted via a different segment while the congestion is ongoing, in order to avoid potential SLA violations that may be caused by transmitting traffic over the congested segment. In this sense, modifications made by network configuration engine 420 may be "dynamic," as network configuration engine 420 may take real-time KPIs into account when determining modifications to make, in order to avoid potential SLA violations.

In some implementations, network configuration engine 420 may make modifications to network nodes based on trends in received KPI information. For example, network configuration engine 420 may identify KPIs that are trending towards a potential SLA violation, and may make network modifications based on the identified trends. For instance, assume that a threshold latency, indicated by a particular SLA, is 40 ms. Further assume that network configuration engine 420 identifies that four data points, for a particular set of traffic (e.g., traffic associated with a particular segment, traffic associated with a particular QCI, traffic associated with a particular service, etc.), indicate latencies of 20 ms, 25 ms, 30 ms, and 35 ms. In this situation, even though the latencies are all below the 40 ms threshold, network configuration engine 420 may identify that an upward trend of the latencies indicates that the SLA may be violated if the trend continues, and may take corrective action based on the identified trend.

Network configuration engine 420 may also, in some implementations, generate and/or output KPI information for presentation to subscribers. The KPI information, presented to subscribers (hereinafter referred to as "presented KPI information"), may be on a less granular basis than KPI information received from KPI information module 410. For instance, the presented KPI information may include data points that are each derived from (e.g., are averages of) multiple data points that correspond to KPI information received from KPI information module 410.

As another example, the presented KPI information may not include some specific KPI information received from KPI information module 410, and/or may be derived from KPI information received from KPI information module 410. For instance, assume that KPI information, received from KPI information module 410, includes intra-node latency associated with base station 310, inter-node latency between base station 310 and MLS 320, and intra-node latency associated with MLS 320. In some implementations, the presented KPI information may not include the above-mentioned latencies, but may include a KPI value derived from these latency values. For instance, the presented KPI information may include a segment latency associated with the segment that includes base station 310 and MLS 320 (e.g., a latency between an ingress of base station 310 and an egress of MLS 320). The segment latency may be, for example, the sum of the intra-node latency associated with base station 310, inter-node latency between base station 310 and MLS 320, and intra-node latency associated with MLS 320.

Figure 9:
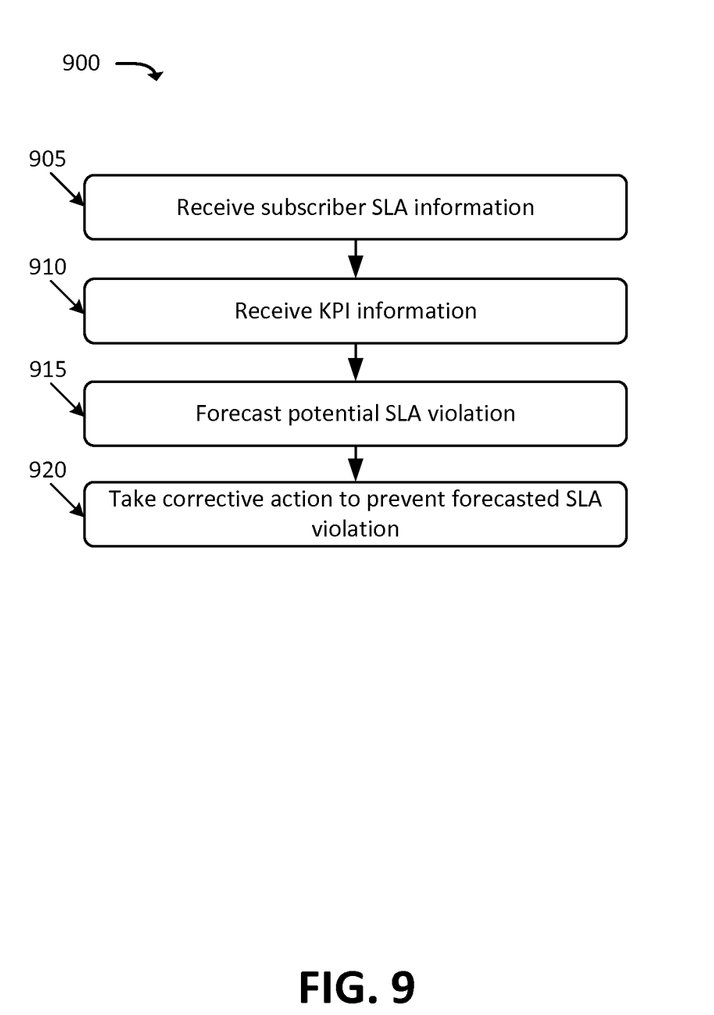
FIG. 9 illustrates an example processes for forecasting and preventing potential SLA violations.

FIG. 9 illustrates an example process 900 for forecasting and correcting potential SLA violations. In one example implementation, process 900 may be performed by NMS 355. In other implementations, some or all of process 900 may be performed by one or more other devices in lieu of, or in conjunction with, NMS 355.

Process 900 may include receiving subscriber SLA information (block 905). For example, as described above with respect to subscriber SLA repository 405, NMS 355 may receive SLA information regarding one or more subscribers. As also described above, the SLA information may be on a per-service basis, on a per-subscriber basis, and/or on another basis. The SLA information may, for example, indicate KPI thresholds that reflect a minimum level of acceptable performance for traffic associated with the one or more subscribers.

Process 900 may additionally include receiving KPI information from the network nodes (block 910). For example, as described above with respect to KPI information module 410, NMS 355 may receive KPI information that reflects actual measured performance of network nodes and/or segments between network nodes. In some implementations, NMS 355 may compute KPI information for segments, based on KPI information, or other information, associated with network nodes that are at endpoints of the links. For instance, if a data packet left base station 310 at a time $t_0$ and arrived at MLS 320 at time $t_1$, NMS 355 may compute that a transport latency (e.g., a latency of a link between base station 310 and MLS 320, which may include backhaul network 315) is the difference between time $t_0$ and time $t_1$.

Process 900 may also include forecasting a potential SLA violation (block 915). For example, as described above with respect to network configuration engine 420, NMS 355 may compare the received KPI information to the SLA specification information to determine whether one or more SLAs may potentially be violated. As described above, for instance, NMS 355 may analyze the KPIs on an ongoing basis to determine whether KPI values exceed thresholds indicated by an SLA, and/or whether KPI values are trending toward exceeding thresholds indicated by an SLA. As also mentioned above, NMS 355 may analyze the KPIs in a more granular fashion than a manner in which KPI information is presented to a subscriber, to which the KPIs are relevant.

Process 900 may further include taking corrective action to prevent the forecasted SLA violation (block 920). For example, as discussed above with respect to network configuration engine 420, NMS 355 may modify the configuration of one or more network nodes, in a manner that may avoid an SLA violation being detected by a subscriber. For example, NMS 355 may output instructions to one or more network nodes to modify routing, scheduling, or other configuration parameters. Additionally, or alternatively, NMS 355 may output an indication that traffic, associated with the forecasted SLA violation, should be given higher priority. For example, NMS 355 may output an indication that a QCI of the traffic should be increased to a higher level (e.g., a level associated with lower latency, lower PER, higher throughput, and/or the like), that the traffic should be given a higher weight in queues, etc.

Figure 10:
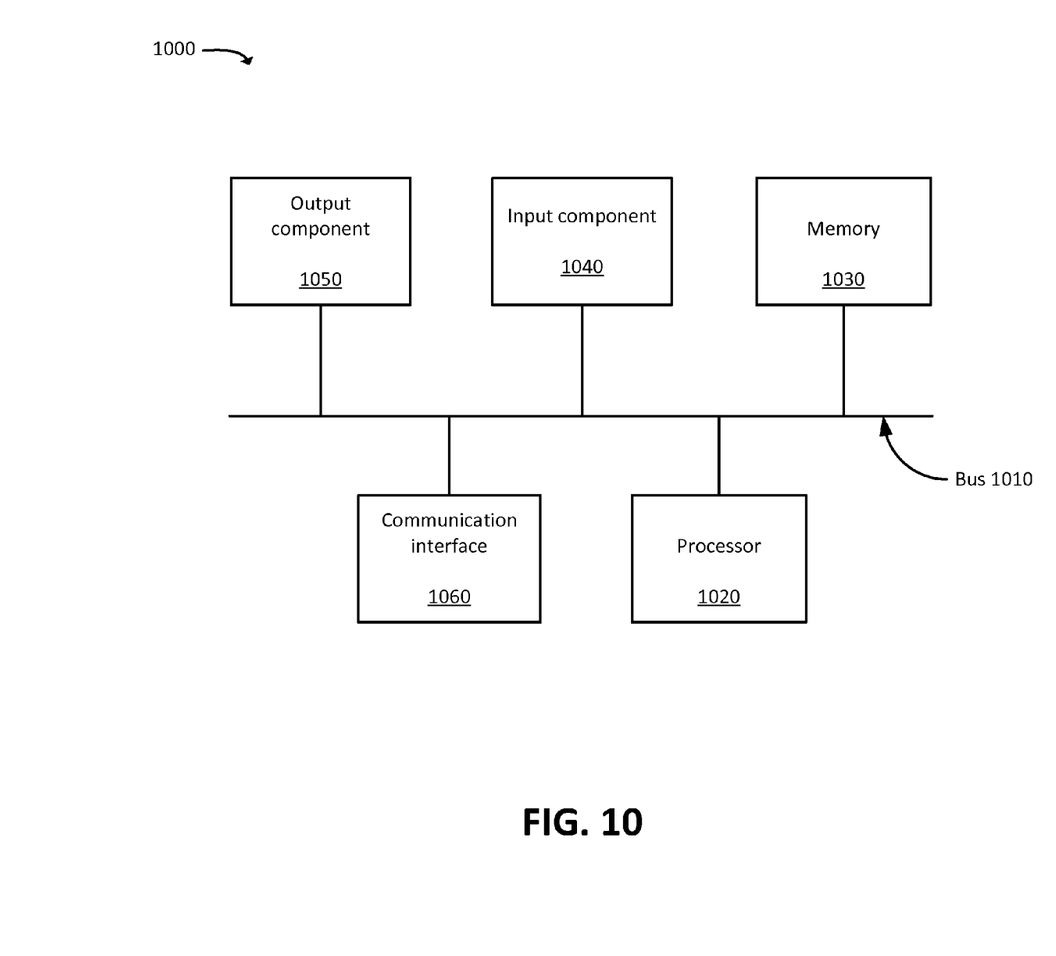
FIG. 10 illustrates example components of one or more devices, according to one or more implementations described herein.

FIG. 10 is a diagram of example components of device 1000. One or more of the devices described above (e.g., with respect to illustrated in FIGS. 1, 3, and/or 4) may include one or more devices 1000. Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, or processing logic that may interpret and execute instructions. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000, such as a keyboard, a keypad, a button, a switch, etc. Output component 1050 may include a mechanism that outputs information to the operator, such as a display, a speaker, one or more light emitting diodes ("LEDs"), etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as an infrared ("IR") receiver, a Bluetooth radio, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations relating to one or more processes described above. Device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while a series of blocks has been described with regard to FIG. 9, the order of the blocks may be modified in other implementations. Further, non-dependent blocks may be performed in parallel.

Additionally, while examples of data structures are illustrated in FIGS. 5-8 as including certain types of information, in practice, these data structures may store additional, fewer, different, or differently arranged types of information than shown in these figures. Furthermore, while these data structures are shown as tables, in practice, these data structures may take the form of any other type of data structure, such as an array, a linked list, a hash table, a tree, and/or any other type of data structure.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations are described herein in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context n which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method, comprising:
   receiving, by a server device, one or more service-level agreements ("SLAs") associated with a subscriber,
      wherein a particular SLA, of the one or more SLAs, indicates a threshold level for a particular key performance indicator ("KPI");
   receiving, by the server device, KPI information for traffic that traverses one or more nodes of a network;
   forecasting, by the server device and based on the KPI information, a violation of the particular SLA, of the one or more SLAs, the forecasting including:
      detecting, within a first period of time, that at least one value, of the received KPI information, exceeds the threshold level,
      the at least one value corresponding to the particular KPI,
      the first period of time being shorter than a second period of time that corresponds to average values of the particular KPI;
   modifying, by the server device and based on the detecting, one or more configuration parameters of one or more nodes of the network to mitigate the violation of the particular SLA,
      wherein the modifying causes a particular average value of the particular KPI, during the second period of time, to not exceed the threshold level; and
   outputting, by the server device and to the subscriber, information that is derived from the KPI information pertaining to the second period of time,
      the derived information being outputted to the subscriber at a slower rate than a rate at which the KPI information is received by the server device, the derived information including the particular average value of the particular KPI,
wherein the derived information does not indicate that the threshold level was exceeded.

2. The method of claim 1, wherein the KPI information includes two or more values, regarding one or more KPIs, and
wherein outputting the derived information includes outputting one value that is based on the two or more values regarding the one or more KPIs.

3. The method of claim 2, wherein the derived information includes an average of the two or more values over the second period of time.

4. The method of claim 1, wherein forecasting the violation of the particular SLA further includes:
identifying a trend associated with the one or more KPIs, and
determining, based on the trend, that the one or more KPIs are likely to exceed the threshold value.

5. The method of claim 1, wherein modifying the one or more configuration parameters of the one or more nodes of the network includes:
outputting an instruction to at least one of the one or more nodes of the network, the instruction causing the at least one node to modify a configuration of the at least one node.

6. The method of claim 5, wherein the modification of the configuration of the at least one node causes traffic, associated with the subscriber, to be re-routed from a first set of routing hops to a different second set of routing hops.

7. The method of claim 1, wherein the KPI information includes information regarding traffic associated with the subscriber, the KPI information including at least one of:
a measure of inter-node latency, associated with the traffic, between two or more nodes of the network,
a measure of intra-node latency, associated with the traffic, and associated with a particular node of the network,
a measure of downlink throughput associated with the traffic,
a measure of uplink throughput associated with the traffic,
a measure of packet error rate ("PER") associated with the traffic,
a measure of packet drop rate associated with the traffic, or
a measure of packet jitter associated with the traffic.

8. A system, comprising:
a non-transitory memory device storing:
one or more service-level agreements ("SLAs") associated with a subscriber,
wherein a particular SLA, of the one or more SLAs, indicates a threshold level for a particular key performance indicator ("KPI"), and
a set of computer-executable instructions; and
one or more processors configured to execute the computer-executable instructions, wherein executing the computer-executable instructions causes the one or more processors to:
receive KPI information for traffic that traverses one or more nodes of a network;
forecast, based on the KPI information, a violation of the particular SLA, of the one or more SLAs, the instructions to forecast further causing the one or more processors to:
detect, within a first period of time, that at least one value, of the received KPI information, exceeds the threshold average level,
the at least one value corresponding to the particular KPI,
the first period of time being shorter than a second period of time that corresponds to average values of the particular KPI;
take corrective action, based on the forecasting,
wherein the corrective action causes a particular average value of the particular KPI, during the second period of time, to not exceed the threshold average level; and
output, to the subscriber, information derived from the KPI information, including the at least one value corresponding to the particular KPI,
the derived information being outputted after taking the corrective action,
the derived information indicating that the particular SLA was not violated during the second period of time.

9. The system of claim 8, wherein the KPI information includes two or more values, regarding one or more KPIs, and
wherein outputting the derived information based on the KPI information includes outputting one value that is based on the two or more values regarding the one or more KPIs.

10. The system of claim 9, wherein the derived information includes an average of the two or more values over the second period of time.

11. The system of claim 8, wherein executing the instructions, to forecast the violation of the particular SLA, further causes the one or more processors to:
identify a trend associated with the one or more KPIs, and
determine, based on the trend, that the one or more KPIs are likely to exceed the threshold value.

12. The system of claim 8, wherein executing the instructions, to take the corrective action, further causes the one or more processors to:
output an instruction to at least one of the one or more nodes of the network, the instruction causing the at least one node to modify a configuration of the at least one node.

13. The system of claim 12, wherein the modification to the configuration of the at least one node causes traffic, associated with the subscriber, to be re-routed from a first set of routing hops to a different second set of routing hops.

14. The system of claim 8, wherein the KPI information includes information regarding traffic associated with the subscriber, the KPI information including at least one of:
a measure of inter-node latency, associated with the traffic, between two or more nodes of the network,
a measure of intra-node latency, associated with the traffic, and associated with a particular node of the network,
a measure of downlink throughput associated with the traffic,
a measure of uplink throughput associated with the traffic,
a measure of packet error rate ("PER") associated with the traffic,
a measure of packet drop rate associated with the traffic, or
a measure of packet jitter associated with the traffic.

15. A method, comprising:
receiving, by a server device and during a particular time period, first key performance indicator ("KPI") information regarding traffic associated with a subscriber,
the first KPI information including a first plurality of values that each correspond to a particular time within the particular time period;
providing, by the server device and to a device associated with the subscriber, second KPI information regarding the traffic, the second KPI information including a second plurality
of data points that each correspond to a particular time
within the particular time period,
each data point, of the second plurality of data points,
being based on at least two data points of the first
plurality of data points;
detecting, by the server device and based on the first KPI
information, that a particular KPI threshold, associated
with the subscriber, has been exceeded,
wherein the particular KPI threshold indicates a threshold value for a duration of time that matches a duration of the particular time period,
the detecting including detecting that at least one value,
of the first KPI information, has exceeded the particular KPI threshold; and
taking, by the server device and based on the detecting,
corrective action,
the corrective action causing the second KPI information, that is based on at least the one value that
exceeded the particular KPI threshold, to reflect that
the particular KPI threshold has not been exceeded.

16. The method of claim 15, wherein the first KPI information includes KPI information regarding a set of network devices,
wherein the second KPI information includes KPI information regarding a subset of the set of network devices.

17. The method of claim 15, wherein at least one of the first KPI information or the second KPI information includes at least one of:

a measure of inter-node latency, associated with the traffic, between two or more nodes of a network,
a measure of intra-node latency, associated with the traffic, and associated with a particular node of the network,
a measure of downlink throughput associated with the traffic,
a measure of uplink throughput associated with the traffic,
a measure of packet error rate ("PER") associated with the traffic,
a measure of packet drop rate associated with the traffic, or
a measure of packet jitter associated with the traffic.

18. The method of claim 15, wherein the particular KPI threshold is associated with a service-level agreement ("SLA") associated with the subscriber.

19. The method of claim 15, wherein the first KPI information is not provided to the subscriber.

20. The method of claim 15, wherein the detecting that at the least one value, of the first KPI information, has exceeded the particular KPI threshold, includes:
detecting that at the least one value, of the first KPI information, has exceeded the particular KPI threshold during a first portion of the particular time period, and
wherein taking the corrective action includes:
modifying parameters, associated with the traffic, during a second portion of the particular time period,
wherein the second KPI information is based on the first KPI information during the first portion of the particular time period and is further based on first KPI information during the second portion of the particular time period.

* * * * *